(12) United States Patent
Willim

(10) Patent No.: US 9,533,560 B2
(45) Date of Patent: Jan. 3, 2017

(54) CRANE WITH ALTERNATE DRIVE UNITS

(71) Applicant: Liebherr-Werk Ehingen GmbH, Ehingen/Donau (DE)

(72) Inventor: Hans-Dieter Willim, Ulm-Unterweiler (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 0 days.

(21) Appl. No.: 14/575,224

(22) Filed: Dec. 18, 2014

(65) Prior Publication Data

US 2015/0175391 A1  Jun. 25, 2015

(30) Foreign Application Priority Data

Dec. 18, 2013  (DE) .................. 10 2013 021 499

(51) Int. Cl.
*B60K 5/08* (2006.01)
*B60K 5/10* (2006.01)
*E02F 9/08* (2006.01)
*B60K 6/20* (2007.10)
*B66C 23/40* (2006.01)
*B66C 23/36* (2006.01)
*B66C 23/38* (2006.01)
*B66C 23/62* (2006.01)

(52) U.S. Cl.
CPC ............... *B60K 6/20* (2013.01); *B66C 23/365* (2013.01); *B66C 23/38* (2013.01); *B66C 23/40* (2013.01); *B66C 23/62* (2013.01)

(58) Field of Classification Search
CPC ............... B60K 5/08; B60K 5/10; B60K 5/12; E02F 9/0808; E02F 9/08; E02F 9/00
See application file for complete search history.

(56) References Cited

U.S. PATENT DOCUMENTS 8,875,829 B2 * 11/2014 Asakage .................. F04C 14/02
180/305
2009/0314559 A1 * 12/2009 Palitto ...................... B60K 5/08
180/65.22

FOREIGN PATENT DOCUMENTS

DE        202 03 309 U1    7/2002

* cited by examiner

*Primary Examiner* — Bryan Evans
(74) *Attorney, Agent, or Firm* — Dilworth & Barrese, LLP

(57) ABSTRACT

The present invention relates to a crane, particularly a crawler crane, whereby at least two different drive units can be alternately connected with the crane. The invention is additionally directed at corresponding drive units.

9 Claims, 2 Drawing Sheets

CRANE WITH ALTERNATE DRIVE UNITS

BACKGROUND OF THE INVENTION

The present invention relates to a crane, particularly a crawler crane, with drive units that can be alternately connected with the crane.

Cranes, such as crawler cranes, for example, are already known from the state of the art. They can be constructed as heavy-lift cranes, which are designed for the lifting of particularly large loads or for overcoming particularly great differences in height.

When such cranes are designed as heavy-lift cranes, the can be configured so that they are not permanently stationary, but can instead be used flexibly at different places of use, even throughout the world. In this connection, it is known to provide such types of heavy-lift cranes with such a construction design that they can be mounted or dismantled, as the case may be, and can also be shipped throughout the globe in a dismantled condition.

In such a global use of a crane, it happens that the crane is used in different regions, in which different requirements are set for the crane because of external conditions. This may involve different climatic conditions, as the result of which certain operating materials of the drive units used in the crane are particularly suitable or particularly unsuitable. This may also involve different applicable norms concerning the operating behavior of the drive unit of the crane.

It can thereby be problematic that the drive unit of a crane, for example, does not meet the emission regulations applicable in a given region or can, because of hot climatic conditions, for example, only use certain operating materials upon the use of an additional and expensive cooling system, such as urea, for example. A crane that has a drive system that is not adjusted corresponding to the requirements of its place of use might, as the result, possibly not be used in a given place of use.

SUMMARY OF THE INVENTION

The task of the present invention is thus to provide a crane that can be used at different places of use.

This task is solved, in accordance with the invention, by a crane, particularly a crawler crane, whereby at least two different drive units can be alternately connected with the crane.

Such a type of design of the crane for alternate operation with at least two different drive units makes it possible, depending on the actual conditions at the place provided for the use of the crane, to provide a suitable drive unit for the crane. The crane can thereby be easily separated from the corresponding drive unit, and thus even for road transport. The connection between the crane and the drive unit or drive units, as the case may be, may be provided by means of mounting on specially provided connecting elements, for example. It is likewise possible to provide bolts on the drive unit or drive units on the crane, as the case may be. The drive unit or drive units, as the case may be, may thereby be constructed in a modular manner in order to make possible a simple coupling or uncoupling, as the case may be, from the crane.

In one additional preferred embodiment, it is conceivable for the crane to comprise at least one undercarriage and one superstructure, whereby the undercarriage and/or superstructure does not include a permanently installed drive unit.

Because of the lack of a permanently installed drive unit or of permanently installed drive units, as the case may be, it is, advantageously, easily possible to ensure that the drive units that are necessary for the operation of the crane are mounted to the crane in the known manner in dependence on the conditions at the place of use of the crane. It is thereby significant that these can, for the transport of the crane components—that is to say, of the drive unit or drive units, among others—be transported separately from the crane, or from one another, as the case may be. The superstructure of the crane can thereby have a rotating connection, by means of which the superstructure is connected with the undercarriage in a rotatable manner.

In one additional preferred embodiment, it is conceivable for the drive units to each include at least one internal combustion engine and at least one hydraulic pump and/or at least one generator.

The drive units can thereby comprise complete internal combustion engines, thus a fuel tank, cooling unit, fan, control, etc. It is additionally conceivable to provide at least one adjustable high-performance hydraulic pump on the internal combustion engines. This pump can be connected with an oil tank. In addition, connection points for the driving of external devices can be provided on the drive units.

The solution in accordance with the invention is consequently also analogously possible through the use of a generator rather than hydraulic pumps. In this case, there are no hydraulic connections between the drive unit and the crane, but electrical connections are provided instead. An electrical motor may also be provided instead of the hydraulic motor. Such generator sets can also be additionally purchased throughout the world as separate components and then connected with the crane.

In addition, it would be also be alternately possible, upon the use of a generator, to not first convert the electrical energy into hydraulic energy, but to directly drive at least one or all of the crane actuators by electrical means instead. It would thus be conceivable for a rotating mechanism drive unit or the drive unit of a fly jib, for example, to be electrically driven. The use of frequency converters would be conceivable in order to be able to achieve different rotational speeds.

In one embodiment, in which the superstructure does not have its own primary power supply, a hydraulic motor can be provided exclusively in the superstructure. This may, for example, be connected with various pumps for the crane actuators by means of a pump transfer casing. An air conditioning compressor can either be also provided in the drive unit or can be located in the superstructure, along with the pumps.

During or after the production of a mechanical connection between the drive unit or drive units, as the case may be, and the crane, a hydraulic connection may also be produced by means of connecting elements provided for that purpose. Other connections, such as electrical or data connections, may likewise be produced or be present between the drive unit or drive units, as the case may be, and the crane.

In one additional embodiment, it is conceivable for the internal combustion engines for the drive units to differ in regard to the emissions standards they meet and/or the operating materials they require.

It is thereby conceivable, for example, to design the internal combustion engine of one drive unit as a diesel engine and the internal combustion engine of the other drive unit as a gas engine. It is also conceivable to use fixed displacement motors, which are always operated at constant rotational speed. In one such case, the fixed displacement motor can either operate the device directly or charge or fill a suitable energy storage unit, as the case may be. If the crane is used in an area in which certain additional operating materials, such as urea, for example, are not available, or can only be made available at excessive expense, then it is conceivable to provide at least one of the drive units with an internal combustion engine that is not exclusively limited to operating materials that can only be provided at great expense. This is particularly advantageous if the crane is to be used in hot countries, since urea has a low boiling point and a continuous and elaborate cooling would consequently be necessary. Advantageously, a more robust drive unit can be used, even in cases in which less stringent emission regulations have to be observed.

In one additional preferred embodiment, it is conceivable for the drive units to be easily connectable with the crane.

An advantageously simple and rapid mounting or dismantling of the crane, as the case may be, in dependence on the conditions prevailing at its planned place of use is thereby made possible.

In one additional preferred embodiment, it is conceivable for the drive units to be connectable with the undercarriage and/or with the superstructure of the crane.

The possibility of flexibly providing the drive units in different areas of the crane, if necessary, thereby makes it possible to advantageously enter into different stress scenarios of the crane and to configure the crane, to the extent possible, in a manner adjusted to the specific stress scenario. The drive unit can thereby also be provided on the undercarriage and then supply a hydraulic motor in the superstructure with power by way of a rotatable connection, for example.

In one additional embodiment, it is conceivable for more than one drive unit to be connected with the crane at the same time, whereby the drive units do not differ in regard to the emissions standards they must meet and/or the operating materials they require.

If the crane is a large crane that requires a large amount of power for operation, then two or more drive units and corresponding hydraulic motors may be necessary for the operation of the crane and will be used correspondingly.

In one additional preferred embodiment, it is conceivable for the drive units to be connected with the crane in place of common ballast and/or as additional ballast.

In this way, it is made possible to reduce the total quantity of ballast necessary for the operation of the crane or of the components necessary for the ballasting of the crane, as the case may be. The drive units thereby fulfill the double function of providing drive force and of providing ballast weight, through which the logistical expense for the transport of the crane or of the crane components, as the case may be, is advantageously reduced.

In one additional preferred embodiment, it is conceivable, in one mode of operation of the crane in which the crane is not movable or is only movable to a limited degree, for the drive units to be placed on the ground close to the crane.

The invention is additionally directed to a drive unit that can be connected with a crane in accordance with the features herein.

BRIEF DESCRIPTION OF THE DRAWINGS

Additional details and advantages of the invention now be illustrated by means of the figures.

These depict the following.

DESCRIPTION OF THE PREFERRED EMBODIMENTS

Figure 1:
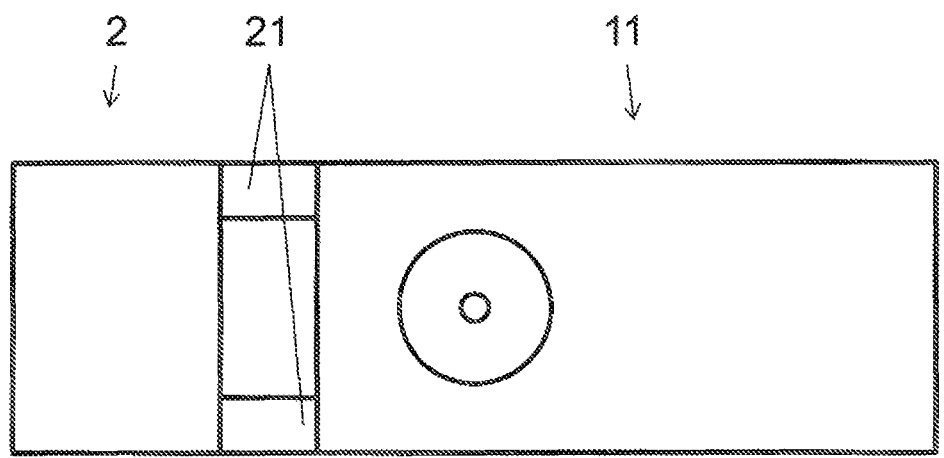
FIG. 1: A schematic representation of a drive unit that is connected with the superstructure of a crane.

The drive unit 2 depicted in FIG. 1 is connected to the superstructure 11 of a crane 1 by means of a connecting element 21. In the embodiment depicted, the crane 1 has no other drive unit.

Figure 2:
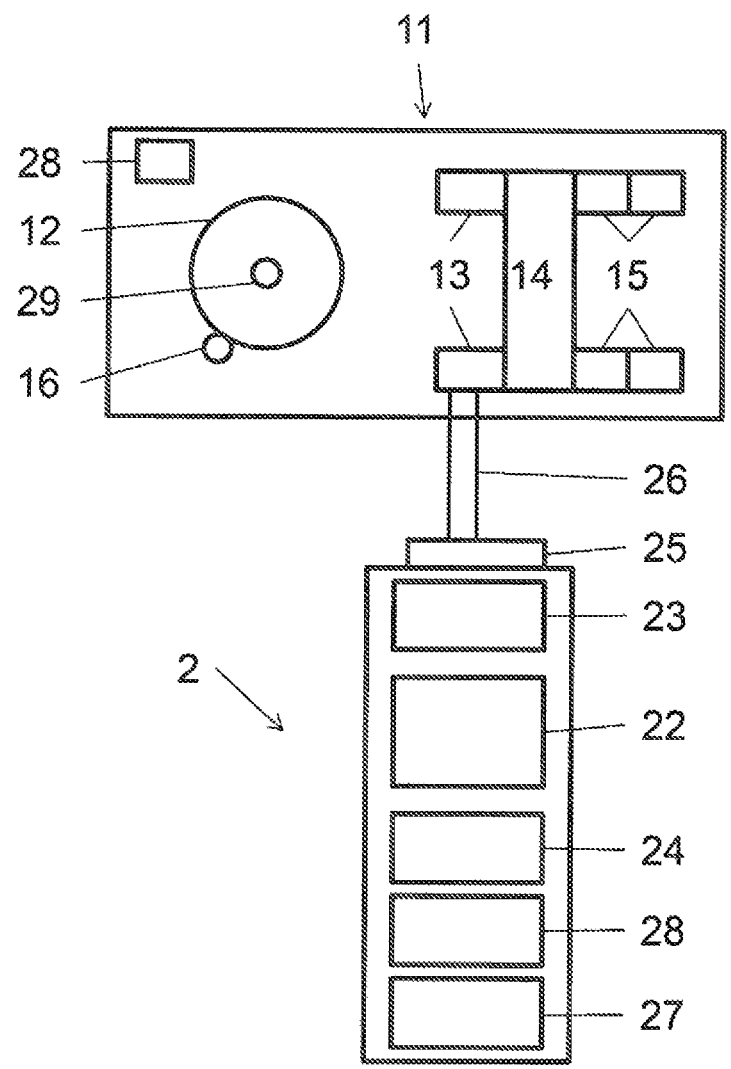
FIG. 2: A detailed representation of a drive unit that is connected to a crane.

FIG. 2 depicts a crane 1, or the superstructure 1 of a crane 1, as the case may be. The superstructure 11 can thereby be connected with an undercarriage, not depicted, by means of a rotating connection 12. The superstructure 11 can thereby be pivoted by means of a mechanism drive unit 16 that rotates relative to the undercarriage. A transmission of power and/or information between the undercarriage and superstructure 11 may thereby provided by means of a rotatable connection 29.

In the embodiment depicted, at least one hydraulic motor 13 for driving a pump 15 or several pumps 15 are additionally provided on the superstructure 11. The pumps 15 can thereby be driven by means of a pump transfer casing 14. In the case of a heavy-lift crane, it is also conceivable for several hydraulic motors 13, such as two, for example, to be provided for the operation of a possibly still greater number of pumps 15. Additional units 28, such as controls and/or storage units, can be provided on the superstructure 11.

The superstructure 11 can be connected with one or more drive units 2 by means of a connection 26, such as a hydraulic connection 26, for example, as in the embodiment depicted. The drive units 2 can thereby include at least one internal combustion engine 22, which can be constructed as a diesel engine, for example. The internal combustion engine 22 can thereby be connected, such as in the embodiment depicted, with at least one hydraulic pump 23, which has corresponding connection points 25 for the connection of the connection 26.

The drive unit 2 can additionally have one or more air conditioning compressor units or air conditioning compressors 27, as the case may be, by means of which a climate control can be provided inside a work booth. In the case of a heavy-lift crane, it is additionally conceivable for two or more air conditioning compressors 27 to be provided in the drive unit 2.

Furthermore, devices such as oil tanks 24, fuel tanks, or other additional units 28, such as controls and/or storage units or the like, can be provided on the drive unit 2.

It is thereby conceivable to provide the drive unit 2 with an internal combustion engine 22 which supplies approx. 350 kW at 1200 revolutions/minute. Internal combustion engines 22 with other dimensions are obviously equally conceivable.

The drive unit 2 is thereby suitable for all crawler cranes that are currently available. Heavy-lift cranes 1 can use several similar drive units 2 simultaneously, In order to start the internal combustion engine 22, the hydraulic pump 23 can be set to zero output, through which an easier start-up of the internal combustion engine 22 is ensured, even at low temperatures.

Since the idling portion in vehicle cranes or cranes 1, as the case may be, amounts to 80%, the pump 23 can, during the idling phases, be to switched over to zero lift, through which a considerable fuel savings can be achieved. In such a case, the air conditioning compressor 27 must be provided on the drive unit 2 in order to maintain the function of the air conditioning unit of the crane 1. Consequently, all hydraulic motors 13 and pumps 15 come to a stop. Only the pump 23 and, possibly, the air conditioning compressor 27 as well, are brought into operation during idling operation. The lower efficiency in normal crane operation caused by the hydraulic shaft that is thereby necessary contrasts with the savings that are thereby brought about. Since the normal crane operation constitutes only approx. 20% of the running time of the internal combustion engine 22, however, fuel savings are brought about over the total running time of the crane 1.

It is conceivable to provide two or more versions of the drive units 2. One unit may thereby be designed for use in Europe and the USA, whereby the emission regulations in accordance with EPA TIER 4 or emission levels in accordance with 97/68/EU IV, respectively, are met, for example. Another drive unit 2 may be designed for use in other parts of the world, such as when meeting emission regulations in accordance with 97/68/EU IIIA, for example.

If two drive units 2 are present on a large crane 1, for example, then it is conceivable for a complete and automatic emergency operation to be possible.

In the event of the failure of one drive unit 2, another drive unit 2 can be transported to the place of use of the crane 1 as a replacement for the failed unit. The defective drive unit 2 can then be brought to a maintenance hangar for maintenance, for example. The crane 1 itself can be brought into operation relatively faster by means of the second replacement drive unit 2, and the better working conditions at the maintenance hangar increase the quality of maintenance of the defective drive unit 2.

On the whole, the considerable logistical advantages for the crane manufacturer stand in contrast to the minor additional expenses for the separation of the drive units from the crane 1 or from the superstructure 11, as the case may be. In addition, it is now possible to construct and to manufacture only one or two drive units 2 for more crane types. Through this, savings result upon manufacturing the drive units 2.

The invention claimed is:

1. A crane (1), particularly a crawler crane, comprising at least two different drive units (2) configured to be alternately connected with the crane (1), wherein
the drive units 2 each include at least one internal combustion engine (22) and at least one hydraulic pump (23) and/or at least one generator (23),
the internal combustion engines (22) differ from the drive units (2) in regard to the emissions standards the meet and/or the operating materials they require,
the crane (1) comprises at least an undercarriage and a superstructure (11), with the undercarriage and/or superstructure (11) not including a permanently installed drive unit (2), and
the superstructure (11) comprises a separate pump (15), a separate hydraulic motor (13) and a pump transfer casing (14) all situated thereon, with the separate pump (15) arranged to be driven by the separate hydraulic motor (13) through the pump transfer casing (14).

2. A crane (1) in accordance with claim 1, wherein the drive units (2) are connectable with the undercarriage and/or with the superstructure (11) of the crane (1).

3. A crane (1) in accordance with claim 1, wherein the drive units (2) are connectable with the crane (1) instead of common ballast and/or as additional ballast.

4. A crane (1) in accordance with claim 1, wherein in one mode of operation of the crane (1) in which the crane (1) is not movable or is only movable to a limited degree, the drive units (2) are placeable on the ground close to the crane (1).

5. A drive unit (2) connectable with a crane (1) in accordance with claim 1.

6. A crane (1) in accordance with claim 1, wherein the internal combustion engine (22) of one drive unit (2) is a diesel engine and the internal combustion engine (22) of the other drive unit (2) is a gas engine.

7. A crane (1) in accordance with claim 1, wherein said two different drive units (2) are additionally configured to be alternately connected with the undercarriage of the crane (1) as ballast, and
additionally comprising connecting elements (21) configured for replaceably connecting the two different drive units (2) to the undercarriage of the crane (1).

8. A crane (7) in accordance with claim 7, wherein each said drive unit (2) additionally comprises a compressor (27), an oil tank (24) and additional controls or storage units (28).

9. A crane (1) in accordance with claim 1, wherein each said drive unit (2) additionally comprises a compressor (27), an oil tank (24) and additional controls or storage units (28).

* * * * *